United States Patent
Stockmaster et al.

(10) Patent No.: US 6,724,344 B1
(45) Date of Patent: Apr. 20, 2004

(54) COMPUTATIONAL ENHANCEMENTS FOR SPACE-FREQUENCY ADAPTIVE PROCESSING (SFAP).

(75) Inventors: Michael H. Stockmaster, Cedar Rapids, IA (US); Charles E. McDowell, Marion, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 10/430,163

(22) Filed: May 5, 2003

(51) Int. Cl.$^7$ ............... H01Q 3/00; G01S 3/16
(52) U.S. Cl. ............ 342/377; 342/383; 342/357.12
(58) Field of Search ................ 342/377, 383, 342/357.12

(56) References Cited

U.S. PATENT DOCUMENTS

| | | | |
|---|---|---|---|
| 4,212,084 A | 7/1980 | Poole | 367/118 |
| 5,606,575 A | 2/1997 | Williams | 375/219 |
| 5,990,831 A | 11/1999 | McDowell | 342/378 |
| 6,298,363 B1 | 10/2001 | Iannuzzelli | 708/400 |
| 6,603,427 B2 * | 8/2003 | Cai et al. | 342/378 |
| 2003/0133524 A1 * | 7/2003 | Miller et al. | 375/347 |

OTHER PUBLICATIONS

Gupta, Inder et al, "Space–Frequency Adaptive Processing (SFAP) for RFI Mitigation in Spread Spectrum Receivers," IEEE 2003.*

Brunner, Christopher et al, "Adaptive Space–Frequency RAKE Receivers for WCDMA" IEEE International Conf. on Acoustics, Speech, and Signal Processing, Mar. 1999, pp. 2383–2386.*

Watanabe, Kazunori et al, "Hybrid Adaptive Algorithm Based on Temporal Update and Spatial Spectrum Estimation for Adaptiv Array Antenna," IEEE VTS–Fall, vol. 1, Sep. 2000, pp. 175–180.*

"FFT Window Functions", pp. 1–4, retrieved on Feb. 26, 2003 from the Internet from http://www.bores.com/courses/advanced/windows/files/windows.pdf.

* cited by examiner

Primary Examiner—Gregory C. Issing
(74) Attorney, Agent, or Firm—Nathan O. Jensen; Kyle Eppele

(57) ABSTRACT

A signal processing system is disclosed. The signal processing system comprises an antenna receiving a radio frequency (RF) signal. The signal processing system also comprises radio frequency circuitry coupled to the RF antenna, an analog to digital converter coupled to the RF circuitry and converting an analog signal from the RF circuitry to a digital signal. The signal processing further comprises a processing device generating a fast Fourier transform including N bins and an adaptive weight calculator calculating no more than (N/2)+1 weights based on information from at least (N/2)−1 bins, the no more than (N/2)+1 weights being applied to the output of the N bins in a weighted summation. Further, the signal processing system comprises an inverse fast Fourier transform calculator producing an inverse fast Fourier transform using the weighted summation.

21 Claims, 6 Drawing Sheets

COMPUTATIONAL ENHANCEMENTS FOR SPACE-FREQUENCY ADAPTIVE PROCESSING (SFAP).

BACKGROUND

The invention relates generally to signal processing for global positioning systems. In particular, the invention relates to using space-frequency adaptive processing (SFAP) for providing anti-jam functionality. More particularly still, the invention relates to computational enhancements of space-frequency adaptive processing for GPS anti-jamming applications.

Global navigation satellite system (GNSS) receivers, such as global positioning system (GPS) receivers, receive and process multiple satellite positioning signals simultaneously. Frequently, GNSS receivers operate in the presence of interfering or jamming signals. Generally, in the presence of such interfering and jamming signals, signal processing techniques such as space-frequency adaptive processing using fast Fourier transforms (FFTs) may be used to filter the jamming signals from the positioning signals.

Fast Fourier transforms (FFTs) are used for processing observed signals. Weighting functions, referred to as windows, are applied to the data to reduce the spectral leakage associated with the finite observation intervals. In the SFAP algorithm, an N point FFT of input data is taken. In each frequency bin, a set of adaptive weights is calculated to remove the jamming power in a given bin. The weights can be chosen optimally by combining the effects of every bin (as there is bin leakage in an FFT) in the weight solution, however typical (and computationally feasible) implementations calculate the weight for a given bin using only the data from the bin. When not jointly optimizing each of the bins, typically windowing is required before the FFT to reduce leakage between the bins. Windowing achieves the effect of attenuating the contribution from bins located several bins and beyond away from the current bin. This is essential for high anti-jam processing as the leakage would look like additional jammers which would significantly reduce the nulling performance of the system. Attenuation of outlying bins is achieved at the cost of "smearing" adjacent bins (increasing the correlation between the adjacent bins) due to widening of the window's main lobe.

One of the inhibiting factors for a practical implementation of digital high anti-jamming technologies for GPS is the large computational burden imposed on the digital signal processor (DSP) by the SFAP algorithm which may be necessary to achieve high (greater than 50 dB) anti-jam protection. The high computational burden adds to increased system costs as an expensive high-end DSP is needed, requires significant power consumption in the DSP, and may even prevent an algorithm from being implemented due to availability of a capable DSP if cost and power are not an issue. For a space-frequency implementation of the adaptive GPS anti-jam processing, it would be desirable to use an algorithm that has been developed to reduce the computational load on the DSP. Further, it would be desirable to provide an algorithm that reduces the computational load on the DSP by a factor of two, yet does not sacrifice performance against broad band jammers and achieves comparable performance for continuous wave (CW) jammers.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to a signal processing system. The signal processing system comprises an antenna receiving a radio frequency (RF) signal, radio frequency circuitry coupled to the RF antenna, and an analog to digital converter coupled to the RF circuitry and converting an analog signal from the RF circuitry to a digital signal. The signal processing system also comprises a processing device generating a fast Fourier transform including N bins. Further, the signal processing system comprises an adaptive weight calculator calculating no more than (N/2)+1 weights based on information from at least (N/2)−1 bins, the no more than (N/2)+1 weights being applied to the output of the N bins in a weighted summation, and an inverse fast Fourier transform calculator producing an inverse fast Fourier transform using the weighted summation.

Another example of the invention relates to a method of providing anti-jamming processing. The method comprises receiving a digital input signal. The method also comprises performing a fast Fourier transform with an output of N frequency bins. The method further comprises calculating a set of adaptive weights based on the output of at least some of the bins, wherein the number of adaptive weights calculated is not more than (N/2)+1. Further still, the method comprises duplicating not more than (N/2) of the not more than (N/2)+1 weights, and applying the not more than (N/2) weights and the not more than (N/2)+1 alternately to adjacent bins.

Yet another example of the invention relates to a global positioning system device. The global positioning system device comprises an antenna receiving a radio frequency (RF) signal, radio frequency circuitry coupled to the RF antenna, and an analog to digital converter coupled to the RF circuitry and converting an analog signal from the RF circuitry to a digital signal. The global positioning system device also comprises a processing device generating a fast Fourier transform including N bins. Further, the global positioning system device comprises an adaptive weight calculator calculating no more than (N/2)+1 weights based on information from at least (N/2)−1 bins, the no more than (N/2)+1 weights being applied to the output of the N bins in a weighted summation, and an inverse fast Fourier transform calculator producing an inverse fast Fourier transform using the weighted summation.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
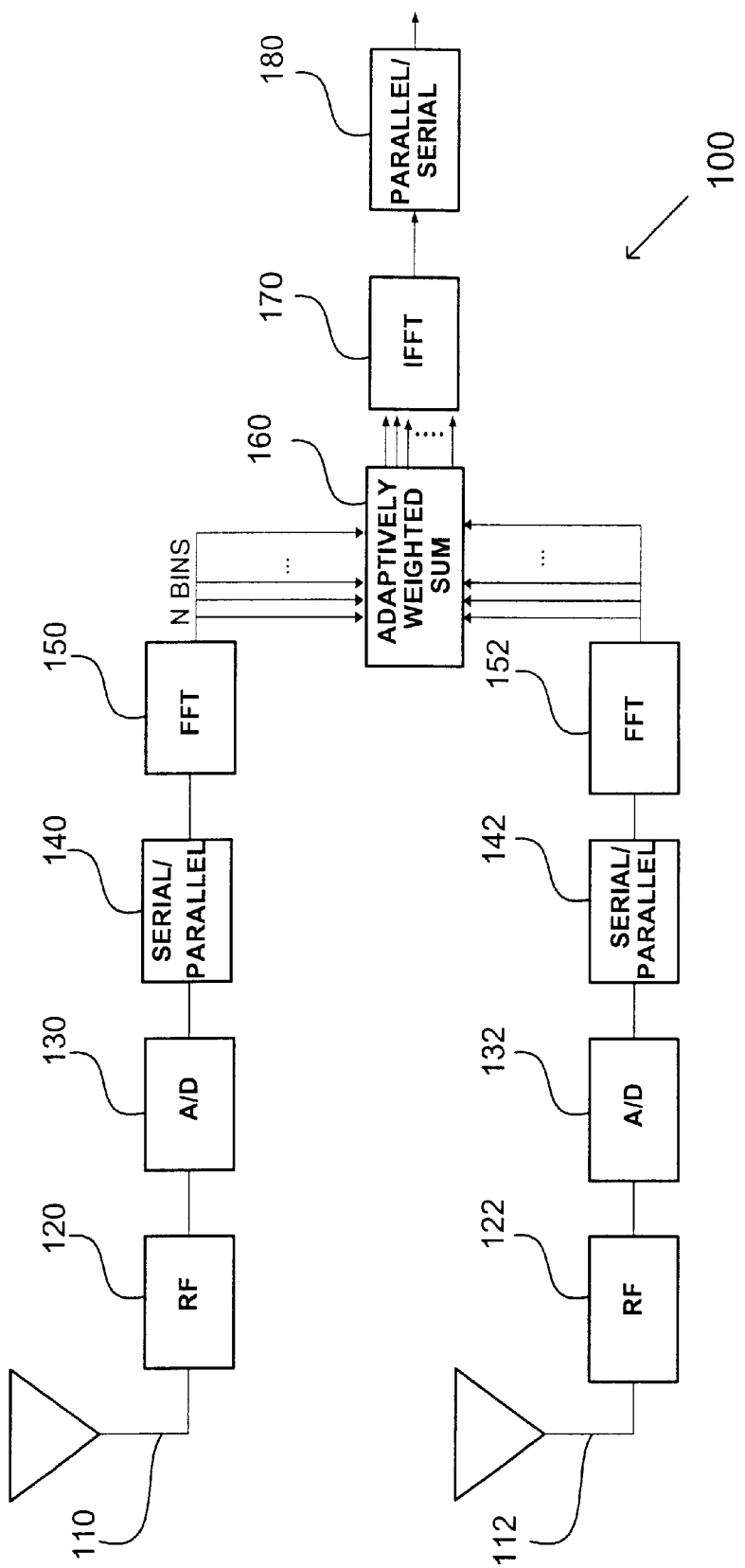
FIG. 1 is a block diagram of an exemplary SFAP processing system.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, a system 100 for receiving radio frequency signals from GPS satellites is depicted. System 100 includes one or more antennas 110 and 112 having RF front ends 120 and 122 configured for receiving RF signals. The incoming RF signals may be converted to digital signals through analog to digital converters (A/D) 130 and 132 and are converted from a serial stream of data to a block of data for FFT processing in block 140 and 142. A digital signal processor carries out a fast Fourier transform (FFT) 150 and 152 in which N points are taken resulting in N frequency bins. A set of adaptive weights ($W_1$, $W_2$ ... $W_N$) is then calculated in accordance with standard FFT adaptive weighting techniques or other similar methods. A weighted sum using the adaptive weights is calculated at calculator 160. An inverse FFT 170 is then calculated and the output is converted back to a serial stream of digital data in block 180.

With regards to the calculation of the adaptive weights, the inventive algorithms take advantage of the fact that adjacent bins are correlated due to windowing. Because adjacent bins are correlated, it is likely that the adaptive weights will be very similar in adjacent bins. In a first algorithm, adaptive weights are calculated in every other bin and the calculated weights are then applied to the adjacent bin. By providing such functionality, the number of computations for the weights is significantly reduced and matrix inversions are reduced by a factor of two. Note that the same computational burden can be achieved by halving the number of bins, however, the same level of anti-jam performance cannot be achieved. The inventive algorithm provides a way to cut the computational burden while still maintaining the benefit of a full set of bins. In an alternative algorithm, the output of adjacent bins is averaged and a single adaptive weight is calculated and applied to each of the adjacent bins. In the case that there are an odd number of bins N, (N/2)+1 weights may be uniquely calculated and applied to the N bins. Further, in the first algorithm, it may be possible to use information from (N/2)−1 bins if N is an even number of bins, and applying the (N/2)−1 weights to the N bins. For example, a weight may be calculated using data from bin 2, and the weight may then be applied to bins 1, 2, and 3, bin 4 may then be used to calculate the weight for bins 4 and 5 and so on.

Figure 4:
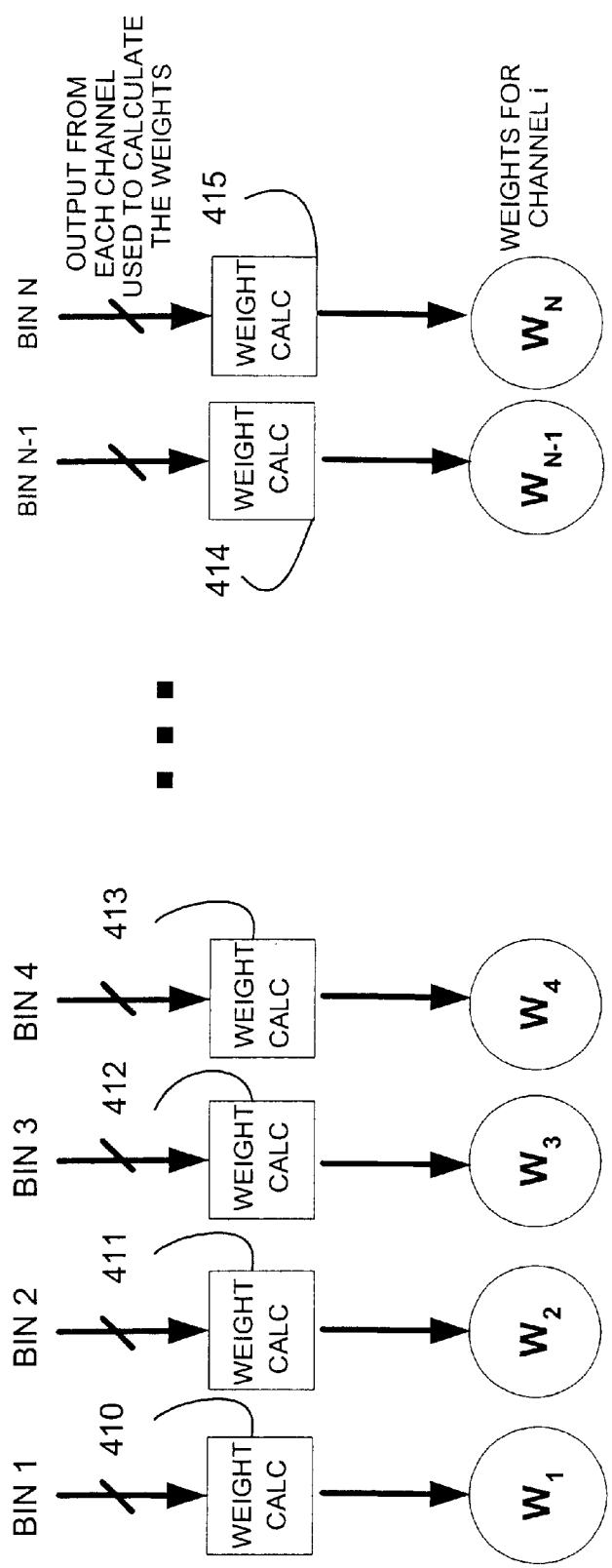
FIG. 4 is an exemplary diagram of a conventional weight calculation for an SFAP application.

In a conventional SFAP algorithm (FIG. 4), weights are calculated for each bin by a weight calculation function 410–415 for each of bins 1 through N. Weights $W_1$ through $W_N$ are separately calculated for bins 1 through bins N.

Figure 2:
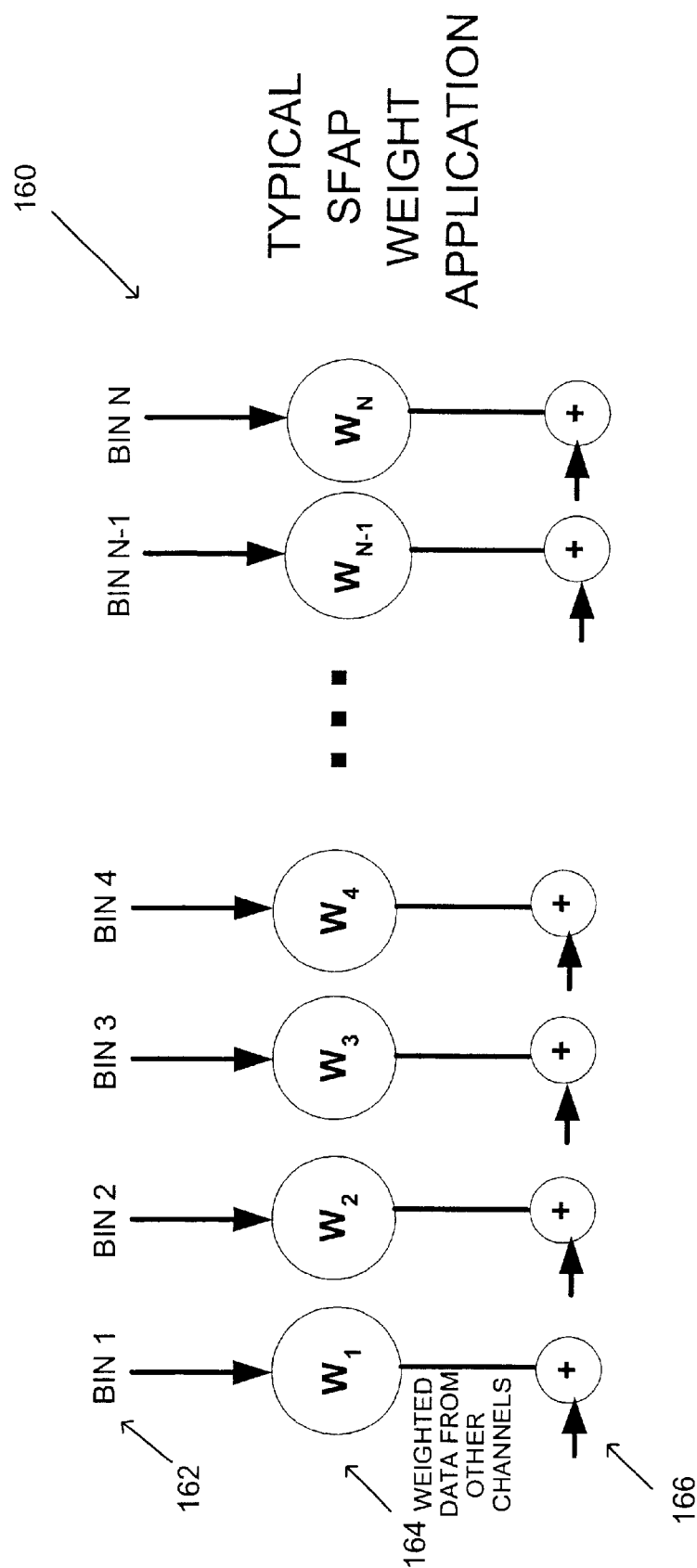
FIG. 2 is an exemplary diagram of a conventional SFAP weight application.

Referring now to FIG. 2, the weights are then applied in a adaptive weighted sum 160 in which the output of each of bins 162 is multiplied by each corresponding adaptive weight 164 and then is summed over the N bins 166.

Figure 3:
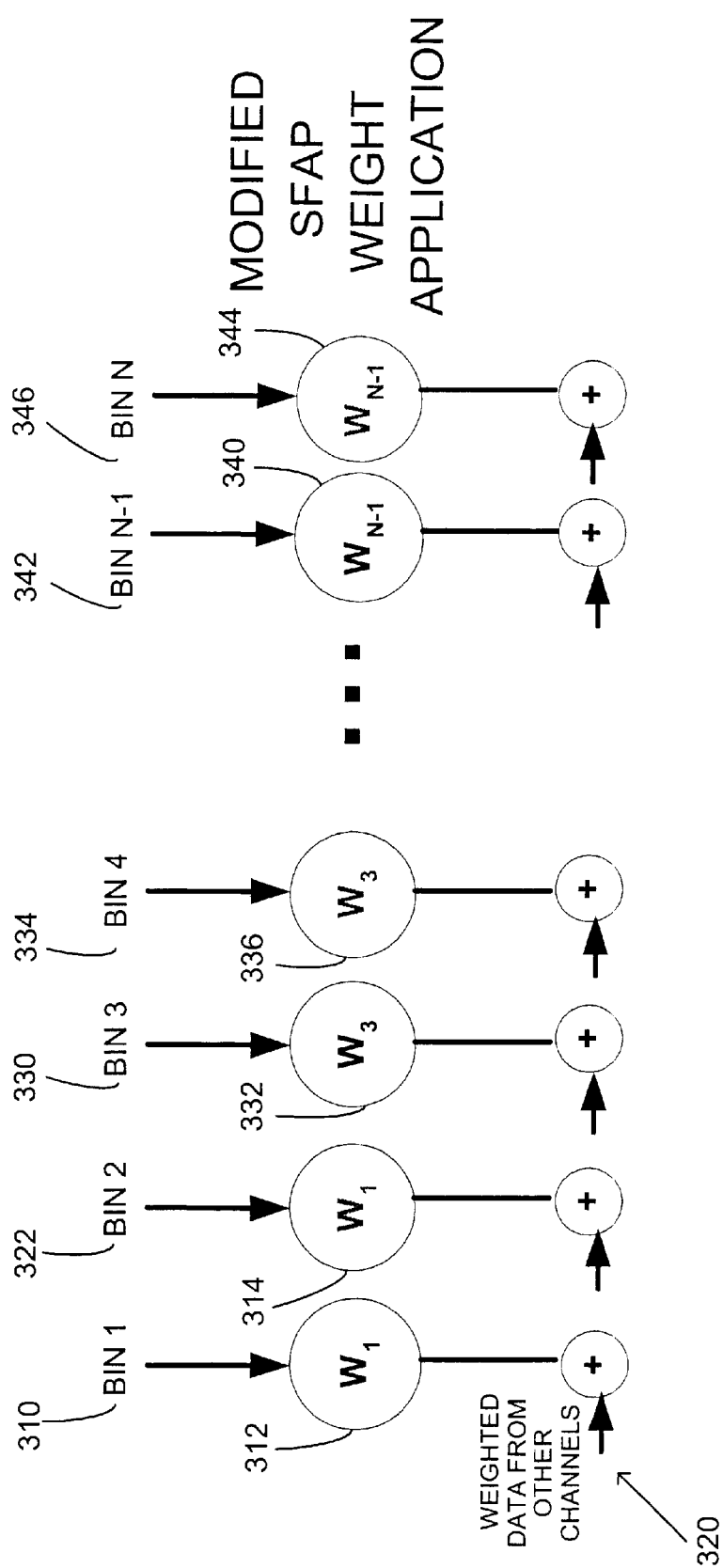
FIG. 3 is an exemplary diagram of a modified SFAP weight application.
Figure 5:
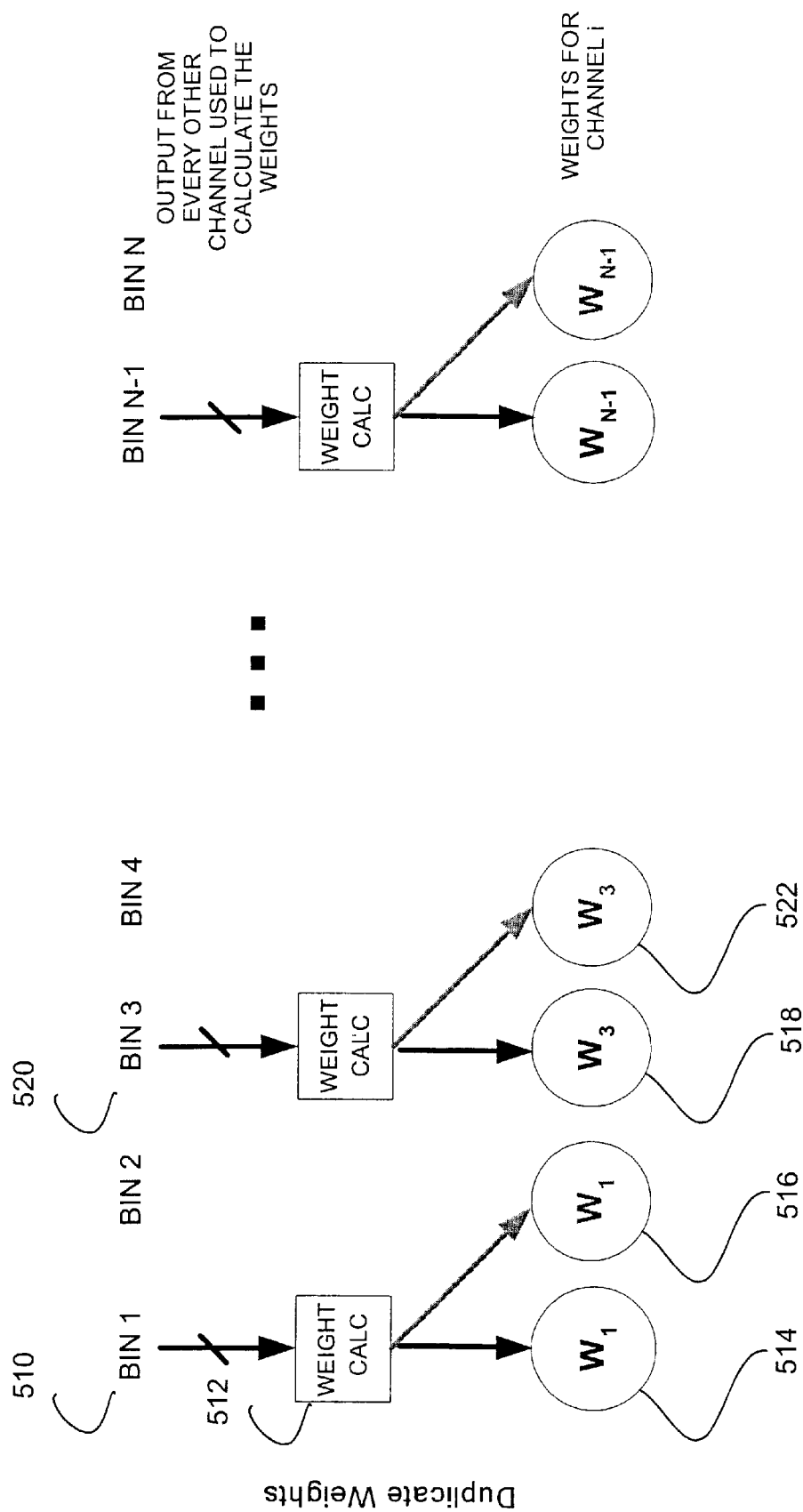
FIG. 5 is an exemplary diagram of a duplicate weight calculation for an SFAP application.

Referring now to FIG. 5, it is desirable to reduce the number of weight calculations and utilize duplicate weights for adjacent bins. For example, as depicted in FIG. 5, input from bin 1 510 is provided to a weight calculator 512 to produce a weight $W_1$ 514. $W_1$ 516 is duplicated to correspond with bin 2. Similarly, a weight $W_3$ 518 is produced from the output of bin 3 520 to provide both weight $W_3$ 518 and a duplicate weight $W_3$ 522 for adjacent bin 4. The weights are then applied in accordance with the diagram depicted in FIG. 3 in which the output of bin 1 310 is multiplied by weight $W_1$ 312 and then is summed with the weighted outputs 320. The output of bin 2 322 is weighted by the duplicate weight $W_1$ 314 and then is added to the weighted sum. Similarly, for bin 3 330, a weight $W_3$ 332 is applied to the output of bin 3 and added to the weighted sum. The output of bin 4 334 is multiplied by the duplicate weight 336 and applied to the weighted sum 320. This is carried out similarly through bin N in which weight $W_{N-1}$ 340 is applied to the output of the bin $N_{-1}$ 342 and the duplicate weight $W_{N-1}$ 344 is applied to the output of bin N 346 which are both applied to the weighted sum 320.

Figure 6:
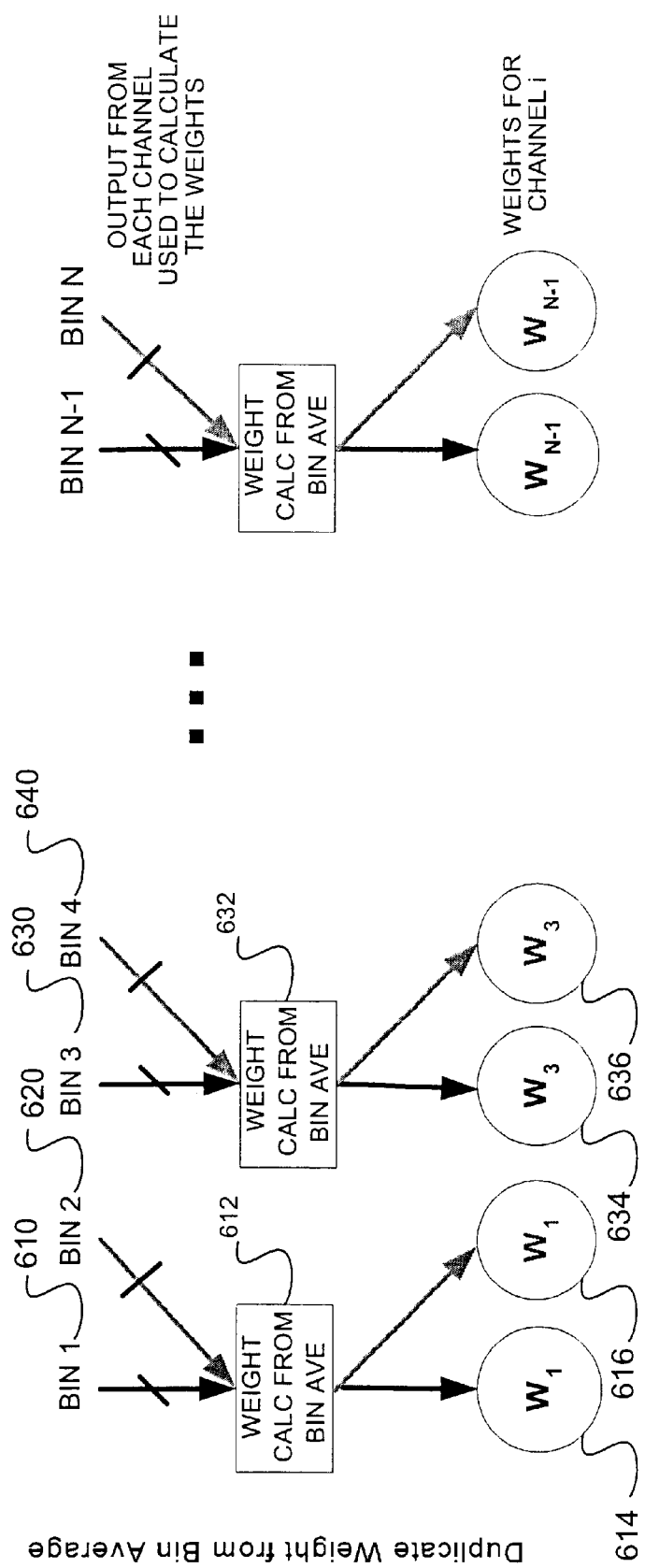
FIG. 6 is an exemplary diagram of an alternative duplicate weight calculation or an SFAP application.

Referring now to FIG. 6, an alternative weight calculation methodology is depicted. In FIG. 6, weight calculator 612 receives input from bin 1 612 and bin 2 620. Based on the information from bin 1 and bin 2, a weight $W_1$ 614 is derived therefrom. Weight 614 is duplicated as weight 616 which is used to weight bin 2 620. Similarly, input from bin 3 630 and bin 4 640 is supplied to weight calculator 632 and averaged to derive weight 3 634 which is duplicated as weight 636 and which is used to weight the bin 4 640 output in the system depicted in FIG. 3.

Exemplary simulation results using a Blackman window have shown the advantages described herein, and showing little more than a 1 dB degradation for broadband noise relative to the full-up SFAP solution (calculation of N weights for N bins). Larger degradation (greater than 10 dB) may be possible with CW jammers due to reduced correlation between adjacent bins depending on how the signal frequency falls relative to the bins. This degradation may be overcome by averaging adjacent bins. In other words, for an N point FFT, bin 1 is averaged with bin 2, bin 3 with bin 4, etc., as earlier described. Broadband jammer performance may improve to within a dB of the full computation algorithm and CW performance may improve within 3 dB when the bins are averaged before the weights are calculated. In an exemplary simulation, the full computational performance corresponds to a null depth in the range of 50–60 dB (based on existing spatial nulling techniques). The following table compares the performance of standard SFAP and the improved algorithms described herein. This example assumes a seven element, 128 bin system for SFAP that optimizes only in the current bin.

|  | SFAP, Full | SFAP, reduced weights | SFAP, reduced weights plus bin averaging |
| --- | --- | --- | --- |
| Mean degradation, BB | 0 | 1 dB | <1 dB |
| Standard deviation, BB | 0 | <1 dB | <1 dB |
| Mean degradation, CW | 0 | 13.5 dB | 3 dB |
| Standard deviation, CW | 0 | 6.2 dB | 4.7 dB |

The following table compares the computational complexity required for the DSP for STAP, SFAP, and this improved algorithm. This example assumes a seven element, 5 tap system for STAP and a seven element, 128 bin system for SFAP. Both algorithms use an adaptive update interval of 1 millisecond. The SFAP optimizes only in the current bin. The anti-jam performance of the two algorithms is comparable.

| Algorithm | Matrix inversions + weight computations (Mega-complex multiplies/second) | Complexity relative to STAP | Complexity relative to SFAP |
|---|---|---|---|
| STAP | 47.8 | 1 | 0.69 |
| Full SFAP | 69.0 | 1.44 | 1 |
| SFAP, reduced weights and bin averaging | 34.5 | 0.72 | 0.5 |

Computational savings of 25% and 50%, relative to STAP and full SFAP, respectively, are realized, and therefore result in a significant reduction in the processing power required in the DSP. Depending on the goals of a given program and the availability of DSP processing power, the improved algorithm may either allow comparable performance with a reduction in power and cost contributed by the DSP (with no change in ASIC requirements, e.g.) or allow the implementation of the algorithm when the processing power is not available with the original SFAP or STAP algorithm.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described and algorithms described may differ depending on the chosen performance characteristics and physical characteristics of the signal processing devices. For example, the type of signal processing device or positioning device used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A signal processing system, comprising:
   an antenna receiving a radio frequency (RF) signal;
   radio frequency circuitry coupled to the RF antenna;
   an analog to digital converter coupled to the RF circuitry and converting an analog signal from the RF circuitry to a digital signal;
   a processing device generating a fast Fourier transform including N bins;
   an adaptive weight calculator calculating no more than (N/2)+1 weights based on information from at least (N/2)−1 bins, the no more than (N/2)+1 weights being applied to the output of the N bins in a weighted summation;
   an inverse fast Fourier transform calculator producing an inverse fast Fourier transform using the weighted summation.

2. The signal processing system of claim 1, wherein the radio frequency signal is a global navigation satellite system signal.

3. The signal processing system of claim 1, wherein the radio frequency signal is a global positioning system (GPS) signal.

4. The signal processing system of claim 1, wherein the fast Fourier transform is performed on a digital signal processor.

5. The signal processing system of claim 4, wherein the adaptive weight calculation is performed on the digital signal processor.

6. The signal processing system of claim 5, wherein the inverse fast Fourier transform is performed on the digital signal processing device.

7. The signal processing system of claim 1, wherein the adaptive weight calculation uses an average of the output of adjacent bins to calculate a weight to be applied to the output of the adjacent bins.

8. The signal processing system of claim 1, wherein the adaptive weight calculation uses the output of every other bin to calculate a first set of weights.

9. The signal processing system of claim 8, wherein the first set of weights is duplicated to form a second set of weights and the first set of weights is applied to the output of the bins used to calculate the first set of weights and the second set of weights is applied to the output of the bins that were not used to calculate the first set of weights.

10. The signal processing system of claim 1, wherein the fast Fourier transform and inverse fast Fourier transform are used to provide anti-jam processing.

11. A method of providing anti-jamming processing, comprising:
   receiving a digital input signal;
   performing a fast Fourier transform with an output of N frequency bins;
   calculating a set of adaptive weights based on the output of at least some of the bins, wherein the number of adaptive weights calculated is not more than (N/2)+1;
   duplicating not more than (N/2) of the not more than (N/2)+1 weights;
   applying the not more than (N/2) weights and the not more than (N/2)+1 alternately to adjacent bins.

12. The method of claim 11, further comprising:
   calculating a weighted sum of the applied weights and the output of the N bins.

13. The method of claim 12, further comprising:
   performing an inverse fast Fourier transform utilizing the weighted sum.

14. The method of claim 13, further comprising:
   providing anti-jam processing using the output of the inverse fast Fourier transform.

15. The method of claim 14, further comprising:
   receiving an analog radio frequency signal from a positioning system satellite.

16. The method of claim 15, further comprising:
   converting the received analog signal to a digital signal.

17. A global positioning system device, comprising:
   an antenna receiving a radio frequency (RF) signal;
   radio frequency circuitry coupled to the RF antenna;
   an analog to digital converter coupled to the RF circuitry and converting an analog signal from the RF circuitry to a digital signal;
   a processing device generating a fast Fourier transform including N bins;
   an adaptive weight calculator calculating no more than (N/2)+1 weights based on information from at least (N/2)−1 bins, the no more than (N/2)+1 weights being applied to the output of the N bins in a weighted summation;

an inverse fast Fourier transform calculator producing an inverse fast Fourier transform using the weighted summation.

18. The global positioning system device of claim 17, wherein the adaptive weight calculation uses an average of the output of adjacent bins to calculate a weight to be applied to the output of the adjacent bins.

19. The global positioning system device of claim 17, wherein the adaptive weight calculation uses the output of every other bin to calculate a first set of weights.

20. The global positioning system device of claim 19, wherein the first set of weights is duplicated to form a second set of weights and the first set of weights is applied to the output of the bins used to calculate the first set of weights and the second set of weights is applied to the output of the bins that were not used to calculate the first set of weights.

21. The global positioning system device of claim 17, wherein the fast Fourier transform and inverse fast Fourier transform are used to provide anti-jam processing.

\* \* \* \* \*